United States Patent
Watanabe et al.

(10) Patent No.: US 9,595,122 B2
(45) Date of Patent: Mar. 14, 2017

(54) DRAWING APPARATUS AND DRAWING METHOD

(71) Applicant: FUJITSU LIMITED, Kawasaki-shi, Kanagawa (JP)

(72) Inventors: Masahiro Watanabe, Kawasaki (JP); Machiko Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 299 days.

(21) Appl. No.: 14/202,126

(22) Filed: Mar. 10, 2014

(65) Prior Publication Data

US 2014/0184590 A1    Jul. 3, 2014

Related U.S. Application Data

(63) Continuation of application No. PCT/JP2011/071152, filed on Sep. 15, 2011.

(51) Int. Cl.
*G06T 11/20* (2006.01)
*G06T 15/04* (2011.01)
*G06T 17/00* (2006.01)

(52) U.S. Cl.
CPC ............ *G06T 11/203* (2013.01); *G06T 15/04* (2013.01); *G06T 17/00* (2013.01); *G06T 2210/24* (2013.01)

(58) Field of Classification Search
CPC ....... G06T 15/04; G06T 11/203; G06T 17/00; G06T 2210/24
See application file for complete search history.

(56) References Cited

U.S. PATENT DOCUMENTS 6,831,659 B1    12/2004    Mukoyama et al.
2007/0038421 A1*    2/2007    Hu .................... G06F 17/5009
                                            703/6

FOREIGN PATENT DOCUMENTS

| JP | 10-222692 | 8/1998 |
| JP | 10-283487 | 10/1998 |
| JP | 2000-197769 | 7/2000 |
| JP | 2000-242631 | 9/2000 |
| JP | 2003-115055 | 4/2003 |
| JP | 2007-226572 | 9/2007 |
| WO | 99-60526 | 11/1999 |

OTHER PUBLICATIONS

Bryan M. Kligner, et al. "Fluid Animation with Dynamic Meshes", ACM SIGGRAPH 2006, pp. 820-825, Aug. 2006.*

(Continued)

*Primary Examiner* — Xiao Wu
*Assistant Examiner* — Chong Wu
(74) *Attorney, Agent, or Firm* — Fujitsu Patent Center

(57) ABSTRACT

A drawing apparatus includes a flow line generation section configured to generate the flow line from a predetermined start position; a view setting section configured to set the viewpoint position in the 3D-space; a band-of-facets forming section configured to form a band of facets connecting a plurality of polygon facets along the flow line based on the set viewpoint position; and a texture mapping section configured to map texture onto each of the plurality of polygon facets. The texture represents reflected light on the band of facets with respect to a light source placed at a predetermined position in the 3D-space.

7 Claims, 20 Drawing Sheets

(56) References Cited

OTHER PUBLICATIONS

Schussman, Greg et al., "Scalable Self-Orienting Surfaces: A Compact, Texture-Enhanced Representation for Interactive Visualization of 3D Vector Fields", Computer Graphics and Applications, 2002. Proceedings. 10th Pacific Conference on Beijing, China, IEEE Comput. Soc, US, 9 Oct. 10, 2002, pp. 356-365, XP010624919.
Schirski, Marc et al., "Virtual Tubelets—efficiently visualizing large amounts of particle trajectories", Computers and Graphics, vol. 29, No. 1, Feb. 1, 2005, pp. 17-27, XP027759563.
Petrovic, Vid et al., "Visualizing Whole-Brain DTI Tractography with GPU-based Tuboids and LoD Management", IEEE Transactions on Visualization and Computer Graphics, IEEE Service Center, vol. 13, No. 6, Nov. 1, 2007, pp. 1488-1495, XP011196434.
Nadella, Suman, "Image Based Rendering", CS 563 Advanced Topics in Computer Graphics, Spring Semester 2005, Mar. 10, 2005, pp. 1-47, XP055188467, Retrieved from the Internet: URL:http://web.cs.wpi.edu/~emmanuel/courses/cs563/S05/talks/suman_wk8_IBR.pdf [retrieved on May 11, 2015].
Watt, A. Ed et al., "3D Computer Graphics, Billboards", Jan. 1, 2000, 3D Computer Graphics, Pearson, p. 235, XP002539447.
Extended European Search Report dated May 19, 2015 for corresponding European Patent Application No. 11872527.4, 11 pages.
Japanese Office Action mailed on Jun. 2, 2015 for corresponding Japanese Patent Application No. 2013-533419, with Partial English Translation, 5 pages.
International Search Report, mailed in connection with PCT/JP2011/071152 and mailed Oct. 18, 2011.
Takahiro Harada, et al., "Parallelization of Particle-based Simulations", Transactions from the Institute of Electronics, Information and Communication Engineers (IEICE), vol. 48, No. 11, pp. 3557-3567, Nov. 2007 (partial translation).
Schussman, Greg et al., "Scalable Self-Orienting Surfaces: A Compact, Texture-Enhanced Representation for Interactive Visualization of 3D Vector Fields", Computer Graphics and Applications, 2002. Proceedings. 10th Pacific Conference on Beijing, China, IEEE Comput. Soc, US, Oct. 9, 2002, pp. 356-365, XP010624919.

\* cited by examiner

| POSITION | NORMAL VECTOR (X, Y, Z) |
|---|---|
| c1 | u1= (0, 6, 4) |
| c2 | u2= (0, 2, 8) |
| c3 | u3= (0, -2, 8) |
| c4 | u4= (0, -6, 4) |

DRAWING APPARATUS AND DRAWING METHOD

CROSS-REFERENCE TO RELATED APPLICATIONS

This application is a continuation application of International Application PCT/JP2011/071152 filed on Sep. 15, 2011 and designated the U.S., the entire contents of which are incorporated herein by reference.

FIELD

The disclosures herein generally relate to a drawing apparatus, a drawing method, and a drawing program.

BACKGROUND

In recent years, computer simulation has been used in various fields due to improvements in calculation capability of computers. The amount of data of a computer simulation result tends to increase with improvements in calculation capability of computers, especially in the field of HPC (High Performance Computing) where the amount of data nowadays is huge compared to that in the past.

FIG. 1 illustrates an example of a visualized computer simulation result. FIG. 1 illustrates flow of a fluid that exists in a cube. In the fluid, molecules constituting the fluid change their positions as time passes. When one focuses on a specific molecule in the fluid and follows movement of the molecule in the fluid as time passes, a trajectory of the movement is called a flow line. Using computer simulation, by defining one or more start points beforehand, multiple flow lines can be calculated from the start points. It is not easy for a person to identify flow lines if only flow lines are drawn among the data of computer simulation because flow lines themselves are lines not having width. Therefore, as illustrated in FIG. 1, flow lines are placed in a 3D-space as tube-shaped objects. In addition, by defining a viewpoint position and applying rendering (drawing process) to objects placed in the 3D-space to obtain a 2D graphical representation viewed from the viewpoint position, visualization of flow lines can be realized.

When performing visualization of flow lines as described above, observation is required from various viewpoint position and viewpoint directions. In this case, it is known to represent a surface of a tube having a 3D form by multiple polygons. Shading with respect to a specific light source is applied to the tube. Texture mapping is performed for coloring and texturing depending on a physical value (for example, fluid speed, temperature, or the like) at each position on the tube. Then, rendering is performed to form a 2D image viewed from a specific viewpoint position and a viewpoint direction. The amount of data of computer simulation is huge (terabytes to petabytes of data) compared to that required conventionally. Therefore, a lot more time is required for an execution of rendering than required conventionally. Moreover, if a viewpoint position or a viewpoint direction is changed, rendering needs to be executed again.

For example, when displaying a person in a VR space, a technology is known in that a model is captured on multiple planes, at least one plane among these multiple planes is selected based on information about a viewpoint position and a viewpoint direction, and a display process is performed based only on information of the selected plane. However, with this technology, multiple planes for a model need to be provided beforehand corresponding to viewpoint positions and viewpoint directions, which increases the number of planes to be provided.

Also, a technology is known in that multiple projection planes are set around an object with 3D image data, parallel projection is made on each of projection planes for a surface of the object that can be viewed, and a texture image is generated that has color data of the surfaces of the object obtained from the projection images on the projection planes. Then, 3D form data is generated that is added with related information that represents a correspondence with a texture image of each of these projection planes. 2D image data is generated that displays the object represented by the 3D form data viewed from an arbitrary viewpoint direction, and a multiplicity of mapping processes is applied to the texture image of each of the projection planes based on the texture related information to reproduce the object.

Also, a technology is known in that based on objects, a light source, and a viewpoint set in a 3D virtual space, model data of an object is transformed into a coordinate system of the viewpoint to generate a 2D image representing a scene of the space, then, the model data represented by the viewpoint coordinate system is projected on a projection plane, and a rendering method for each of the objects is switched by considering a direction from the viewpoint to the object of interest as a reference.

FIG. 2A illustrates tube-shaped wire frames that visualize flow lines represented by a number of polygons contained in the wire frames. Also, FIG. 2B illustrates a flow of a visualization process of a flow line. As described above, the number of polygons increases year by year. Also, a physical value exists at each position in the space. Examples of a physical value include a scalar value such as vorticity, a vector value such as velocity and stress, and a tensor value such as shear stress. First, at Step 210, data such as a simulation result is received as input. Next, at Step 220, a process such as filtering is applied to numerical data if necessary. Then, at Step 230, a flow line is calculated first. As illustrated in FIG. 2A, a tube-shaped form with a number of polygons is generated to represent the flow line having a tube shape. Next, at Step 240, shading or the like is applied by a graphical process, and then, rendering is performed. Physical values are represented using color on the polygons.

As above, physical values obtained with computer simulation increase in recent years, and tube shapes having a lot more number of polygons than those conventionally processed need to be given color and shading for rendering of a 2D image. This requires a huge amount of calculation and a long time compared to those required conventionally.

In addition, for an ordinary 3D visualization process where a transmission process for a hidden surface that blocks a viewpoint is not performed or the viewpoint is not moved, shapes that cannot be viewed from the viewpoint on the hidden surface side do not need to be calculated for visualization. However, for visualization of computer simulation data or the like where the viewpoint needs to be moved freely for observation, calculation for visualization is required for the shapes that cannot be view from the viewpoint on the hidden surface side.

RELATED-ART DOCUMENTS

Patent Documents

[Patent Document 1] Japanese Laid-open Patent Publication No. 10-222692
[Patent Document 2] Japanese Laid-open Patent Publication No. 10-283487
[Patent Document 3] Japanese Laid-open Patent Publication No. 2003-115055

SUMMARY

According to at least one embodiment of the present invention, a drawing apparatus includes a flow line generation section configured to generate the flow line from a predetermined start position; a view setting section configured to set the viewpoint position in the 3D-space; a band-of-facets forming section configured to form a band of facets connecting a plurality of polygon facets along the flow line based on the set viewpoint position; and a texture mapping section configured to map texture onto each of the plurality of polygon facets. The texture represents reflected light on the band of facets with respect to a light source placed at a predetermined position in the 3D-space.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

Figure 1:
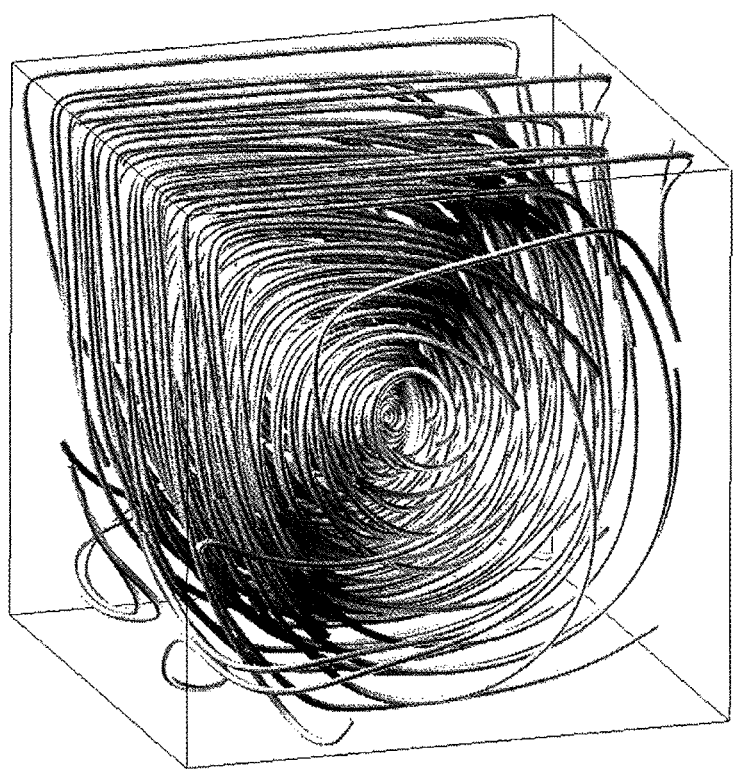
FIG. 1 is a schematic view illustrating an example of visualization of a computer simulation result.
Figure 2A:
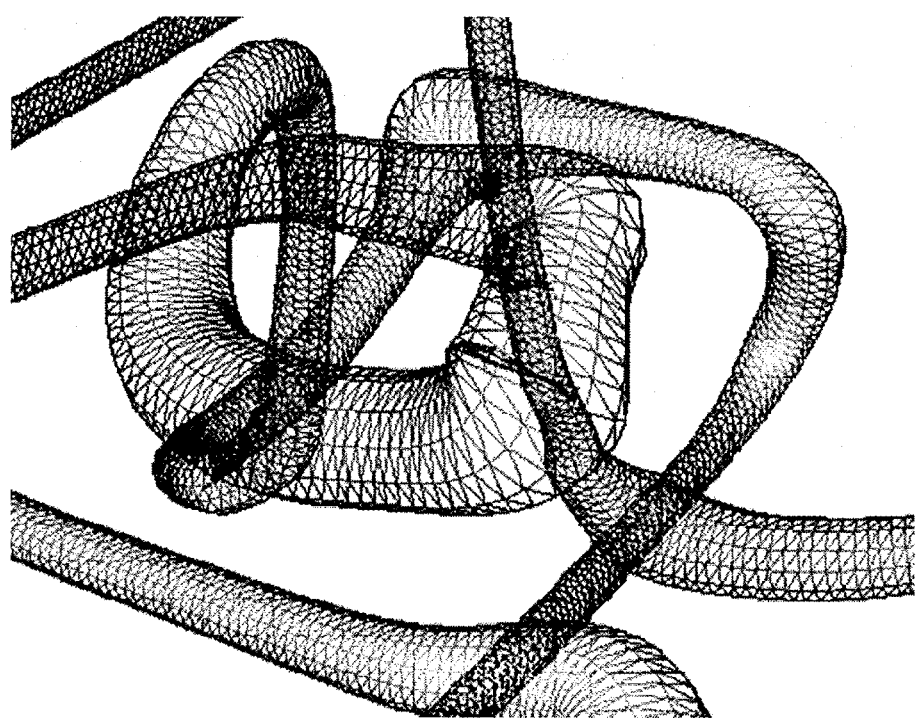
FIG. 2A is a schematic view illustrating that flow lines are drawn with tubes represented by a number of polygons.
Figure 2B:
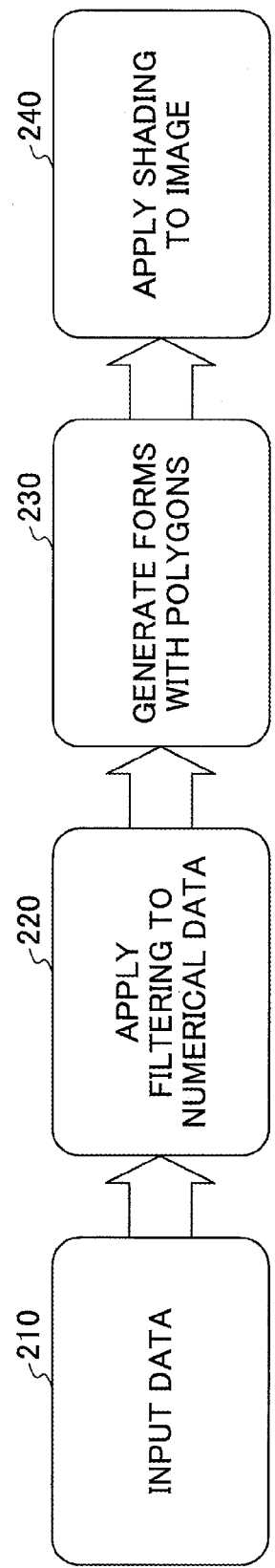
FIG. 2B is a schematic view illustrating a flow of a visualization process of a flow line.
Figure 3:
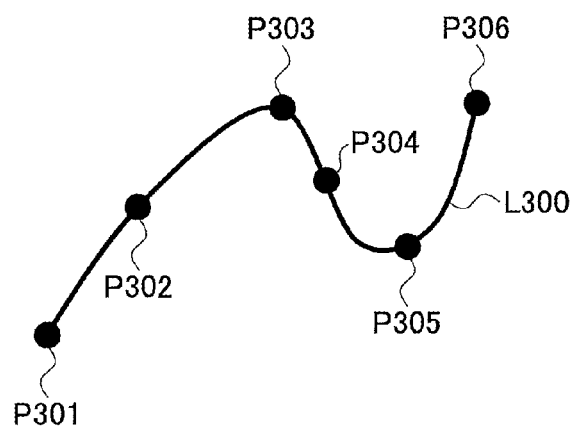
FIG. 3 is a schematic view illustrating a flow line.

FIG. 3 illustrates a flow line L300 in a fluid (not illustrated) that fills a 3D space. In general, a curve formed by tracing points along velocity vectors of a fluid molecule at certain moments is called a "flow line". Also, a curve formed by connecting multiple fluid molecules flowing from the same start point one by one at a certain moment is called a "streak line". In addition, a curve formed by continuously tracing a movement path of a fluid molecule is called a "path line". These three are the same in a stationary flow, but different in a non-stationary flow. In the present specification, the word "flow line" is used as a generic term for the above "flow line", "streak line" and "path line" for convenience's sake. It is needless to say that multiple embodiments described in the present specification can be applied to any of these three.

In FIG. 3, the flow line L300 can be calculated using vector fields at time steps as input data to a Runge-Kutta method or a Dormand-Prince method that is known to one skilled in the art on the day when this application is filed. The flow line L300 may have points (nodal points) P301-P306 disposed at characteristic parts having great curvature.

Embodiments

FIGS. 4A-4D illustrate processes for forming a band of facets constituted with connected quadrangles along a flow line. Note that although quadrangles (rectangle) are used in the present embodiment, polygons other than quadrangles may be used.

Figure 4A:
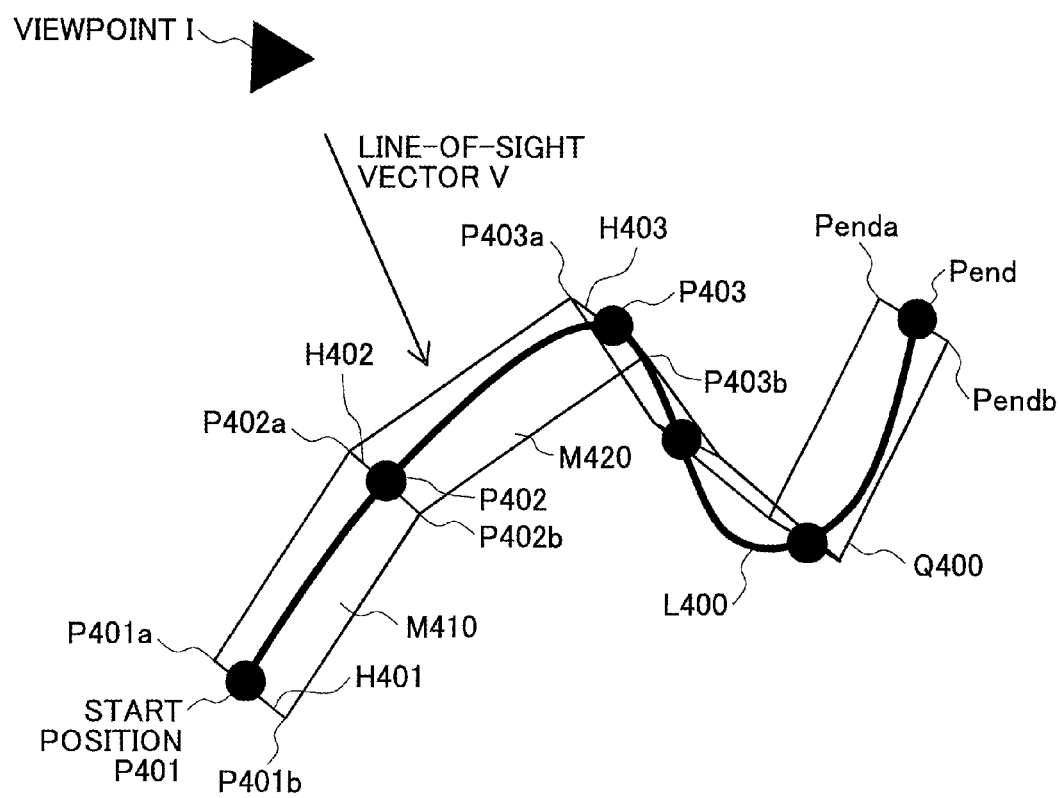
FIG. 4A is a schematic view illustrating a process for forming a band of facets constituted with connected quadrangles along a flow line.

In FIG. 4A, a viewpoint I and a line-of-sight vector V is set in a 3D-space. The viewpoint I and line-of-sight vector V may be specified by a user. If they are not specified by a user, a position of the viewpoint I and a value of the line-of-sight vector V may be predetermined beforehand to be used. Also, to observe the flow line from various angles, these values may be appropriately changed by the user. Information of the specified viewpoint I and line-of-sight vector V is stored in a storage section, to be used by a system of the present embodiment.

A flow line L400 is illustrated from a start position P401 to a termination position Pend. First, a quadrangle M410 is generated so that the start position P401 and an adjacent nodal point P402 on the flow line L400 are included. The start position P401 may exist on a side H401 of the quadrangle M410 and the nodal point P402 may exist on a side H402. The sides H401-H402 passing through the nodal points may be set to have a predetermined fixed length. Alternatively, the length of a side may be determined depending on a physical value (for example, the velocity or temperature of the fluid) at the nodal point. The quadrangle M410 has four vertices (P401a, P401b, P402a, and P402b). The slope of the facet of the quadrangle M410 is determined so that the area of the quadrangle M410 is at a maximum when viewed from the viewpoint I. Similarly, a quadrangle M420 is generated using the nodal point P402 and a nodal point P403. The quadrangle M420 has the side H402 passing through the nodal point P402, a side H403 passing through the nodal point P403, and four vertices (P402a, P402b, P403*a*, and P403*b*). The quadrangle M410 and quadrangle M420 share the side H402. Note that the quadrangles do not necessarily have to be rectangles or squares, but may be parallel quadrangles or trapezoids. Alternatively, they may be polygons other than quadrangles, such as triangles. By repeating the above operation, quadrangles are generated up to the termination position Pend. By these operations, a band of facets Q400 is formed along the flow line L400 by connecting the multiple quadrangles. Note that details of an algorithm for determining the direction of the facet of each of the quadrangles will be described later.

Figure 4B:
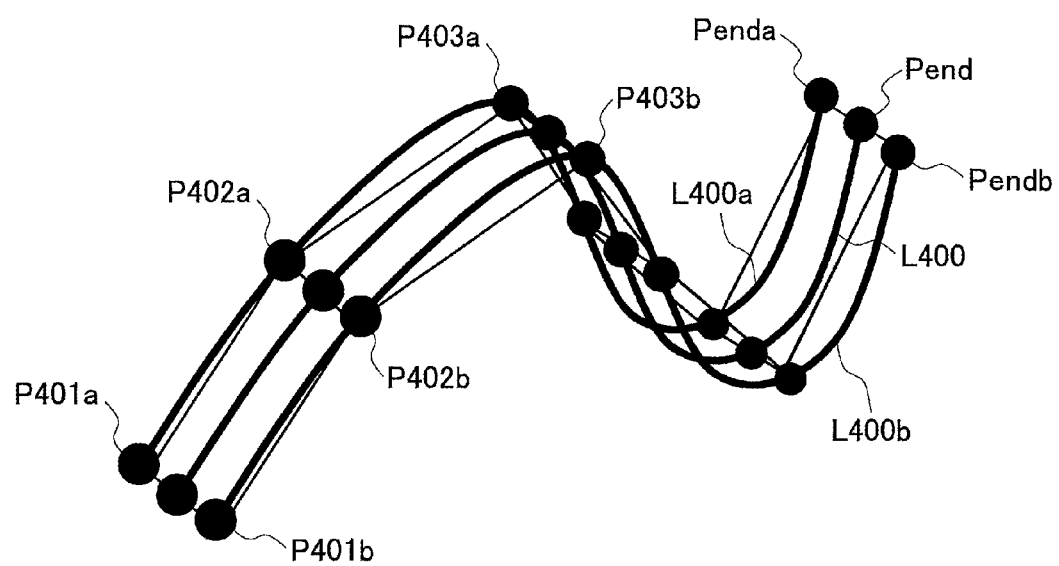
FIG. 4B is a schematic view illustrating a process for forming a band of facets constituted with connected quadrangles along a flow line.

FIG. 4B illustrates an operation to copy a flow line of interest to a new flow line parallel to the flow line of interest. As will be described later with FIG. 4C, this operation can act as a preprocess for smoothing the band of facets Q400 by increasing the number of quadrangles. It should be noted that there may be another process for generating an appropriate number of quadrangles that differs from the method described here. For example, the number of nodal points in FIG. 4A may be increased beforehand to generate quadrangles. Approximate flow lines of the flow line L400, or flow lines L400*a* and L400*b*, are drawn that have the flow line L400 in-between. L400*a* may be a curve that is generated by translating the flow line L400 so that it passes the vertices P401*a*, P402*a*, P403*a*, . . . , and Penda of the quadrangles. Similarly, a curve L400*b* is generated that passes the vertices P401*b*, P402*b*, P403*b*, . . . , and Pendb of the quadrangles. Note that although the two new curves are generated to have the flow line of interest in-between in the present embodiment, only one new flow line may be generated.

Figure 4C:
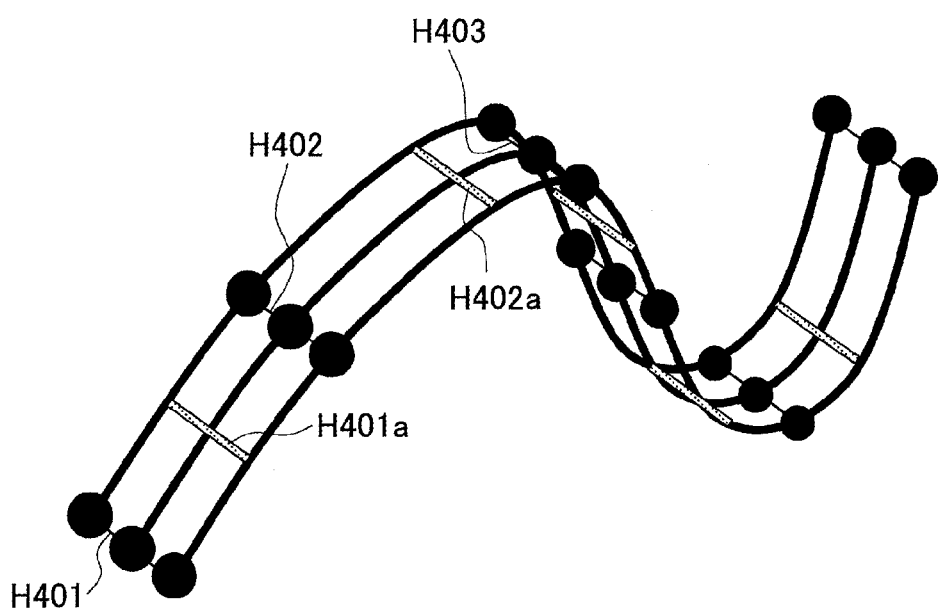
FIG. 4C is a schematic view illustrating a process for forming a band of facets constituted with connected quadrangles along a flow line.

FIG. 4C illustrates an operation for increasing the number of quadrangles by adding sides. For example, a side H401*a* is added between the side H401 and side H402. Similarly, a side H402*a* is added between the side H402 and side H403.

Addition of a side may be executed, for example, as follows.

(1) Obtain a gradient (gradient vector) of a line segment connecting two adjacent nodal points in each flow line.

(2) If the difference of the gradient of the line segment connecting the two adjacent nodal points is greater that a predetermined threshold value th, for example, generate a new nodal point at the midpoint of the two nodal points.

(3) Generate a new side that connects the new nodal points generated in each flow line.

(4) Generate a quadrangle that is constituted with the new side and an adjacent existing side.

With the above operation, for example, a new quadrangle can be formed that has the side H401 and new side H401*a*. Similarly, a new quadrangle is formed with the side H401*a* and side H402. By repeating the operation, the number of quadrangles can be increased. Note that a method of increasing quadrangles is not limited to the one in the present embodiment as mentioned earlier.

Note that a new nodal point other than the midpoint of the two nodal points may be generated at the step (2) of the above operation.

Figure 4D:
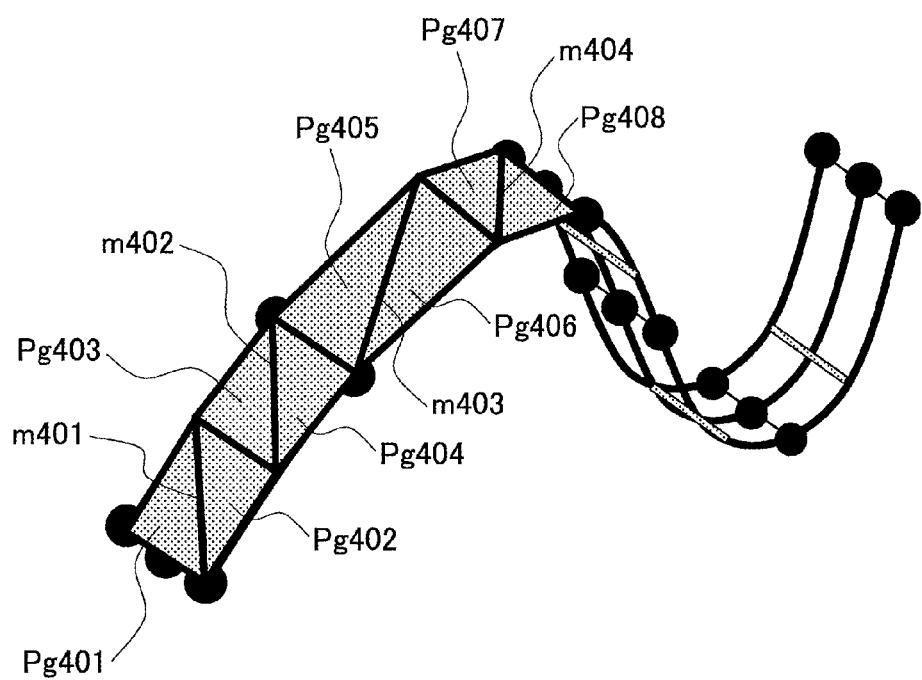
FIG. 4D is a schematic view illustrating a process for forming a band of facets constituted with connected quadrangles along a flow line.

FIG. 4D illustrates an operation for forming triangular polygons. Polygons are used when partitioning a surface of a cubic form when the cubic form is represented three-dimensionally. Considering easiness of calculation, triangles are used as polygons. In the present embodiment, triangular polygons are formed. For example, by drawing a diagonal line m401 in a quadrangle, triangular polygons Pg401-Pg402 are formed. By drawing diagonal lines m401-m404, polygons Pg401-Pg408 are formed. By forming triangular polygons, it becomes easier to use general-purpose 3D graphical software and rendering hardware for processing. Note that the length of a side among sides of a quadrangle that crosses a flow line may be elongated or contracted based on a physical value at the position of the flow line at this stage. By elongating or contracting the length of a side, the thickness of a tube can be changed. It is needless to say that elongation or contraction of the length of a side may be done at another stage if appropriate. Note that it is not mandatory to generate polygons for rendering of a 2D image that has tube-shaped forms finally.

A conventional technology requires a greater number of polygons per flow line. Therefore, a huge amount of time is required for visualization of flow lines depending on image processing performance of a computer used for the process. Therefore, a method is known that simply reduces the amount of data at an input stage. Simulation data that has already been discretized in time and space is made sparser by performing sampling again. This method has a risk of creating a phenomenon which an observer wants to observe may not be correctly reproduced. Namely, this method reduces information before starting the process, which makes the likelihood higher in that the structure of flow lines is not the same as the data before the reduction.

In contrast to the above, the number of polygons per flow line can be considerably reduced without reducing the amount of data according to the present embodiment.

Figures 5A, 5B:
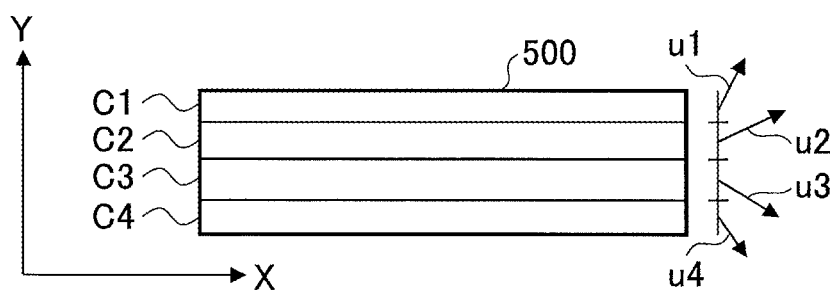
FIG. 5A-5B are schematic views illustrating a normal line map.

FIG. 5A is a schematic view illustrating a normal line map. If rendering is applied to a quadrangle 500 as it is, the quadrangle 500 is simply drawn as a plain facet because the quadrangle 500 is a facet. To make the quadrangle have looks of a tube shape, normal vectors u1-u4 are mapped on regions c1-c4 in the quadrangle, respectively. The normal vectors u1-u4 are set so that they simulate normal lines on a tube shape. FIG. 5B illustrates an example of a table used for storing normal line map information in a memory. Values of the normal vectors are stored by associating with the respective positions. Note that although normal vectors are associated with four positions according to the present embodiment, a normal line map having a lot more vectors may be used to finely associate with positions. Also, instead of the normal line map, a height map that represents the height of a tube shape may be preserved.

Note that, by preserving a normal line map corresponding to the rectangle 500, a normal line map can be calculated for another quadrangle (rectangle) such as a parallel quadrangle or a trapezoid. For example, four corner vertices of the quadrangle 500 may be associated with four corner vertices of a trapezoid to map the normal line map into the trapezoid using substantially the same method as morphing. Similarly, for polygons other than triangles or quadrangles, the normal line map of the rectangle 500 can be used. It is needless to say that normal line map information for triangles or other polygons may be separately stored as library.

Note that although triangles are used as polygons in the example described above, polygons are used in the method of modeling of a 3D form, which can be treated separately from the data structure of the normal line map.

Figure 6A:
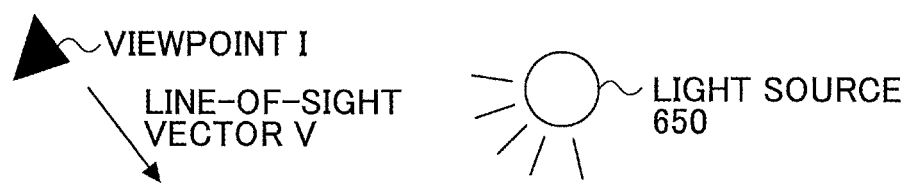
FIGS. 6A-6B are schematic views illustrating a mapping of color texture corresponding to reflected light and a physical value.
Figure 6A:
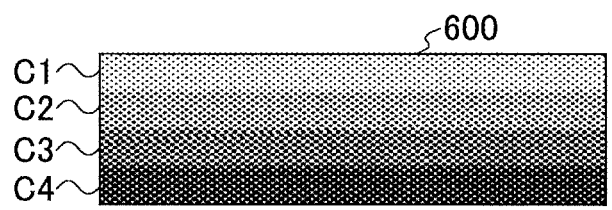

FIG. 6A illustrates a mapping of texture of reflected light. A result of rendering of a quadrangle 600 is illustrated when viewing the quadrangle 600 from a viewpoint I in a direction of a line-of-sight vector V where the normal line map described above is applied and reflection of light from a light source 650 is taken into consideration. The applied texture taken as an example has a single color.

Figure 6B:
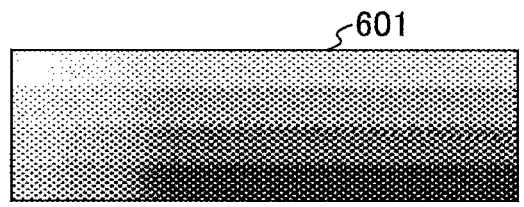

FIG. 6B illustrates a result of rendering using texture in which a physical value (for example, speed) at each position of a flow line is mapped onto color. Although FIG. 6B is drawn with black and white shades, texture with a color variation may be used for mapping in an actual case.

In this way, a flow line can be visualized with a tube shape, and a physical value (for example, temperature) at each position of the flow line can be represented with color. Further, by changing thickness of a tube shape depending on another physical value (for example, speed), the color and thickness of the tube shape can represent the two physical values (for example, temperature and speed) simultaneously (see FIG. 9).

Figure 7:
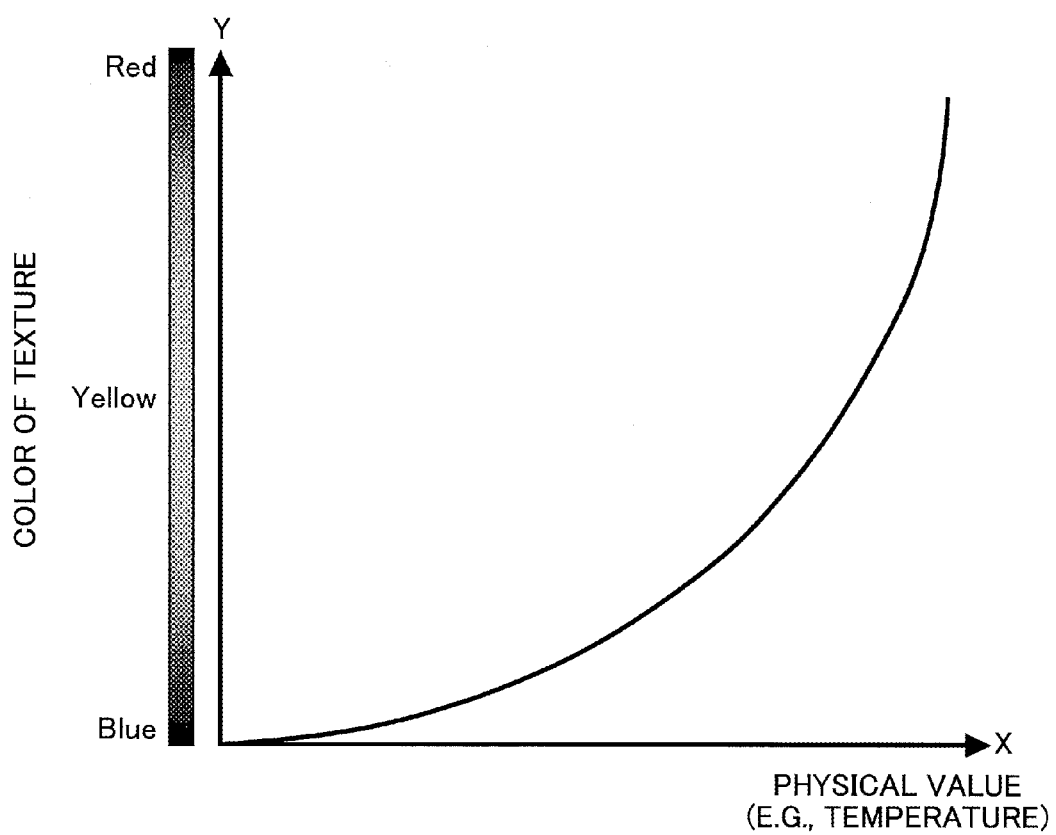
FIG. 7 is a schematic view illustrating a mapping between a physical value and color of texture.

FIG. 7 illustrates a mapping between a physical value and color of texture. For example, FIG. 7 illustrates a relationship for mapping temperature as a physical value of a fluid onto a texture of color for a quadrangle. It is mapped onto blue if the temperature is low, or it is mapped onto red if the temperature is high. If the temperature is somewhere in-between, it is mapped onto yellow.

Figure 8:
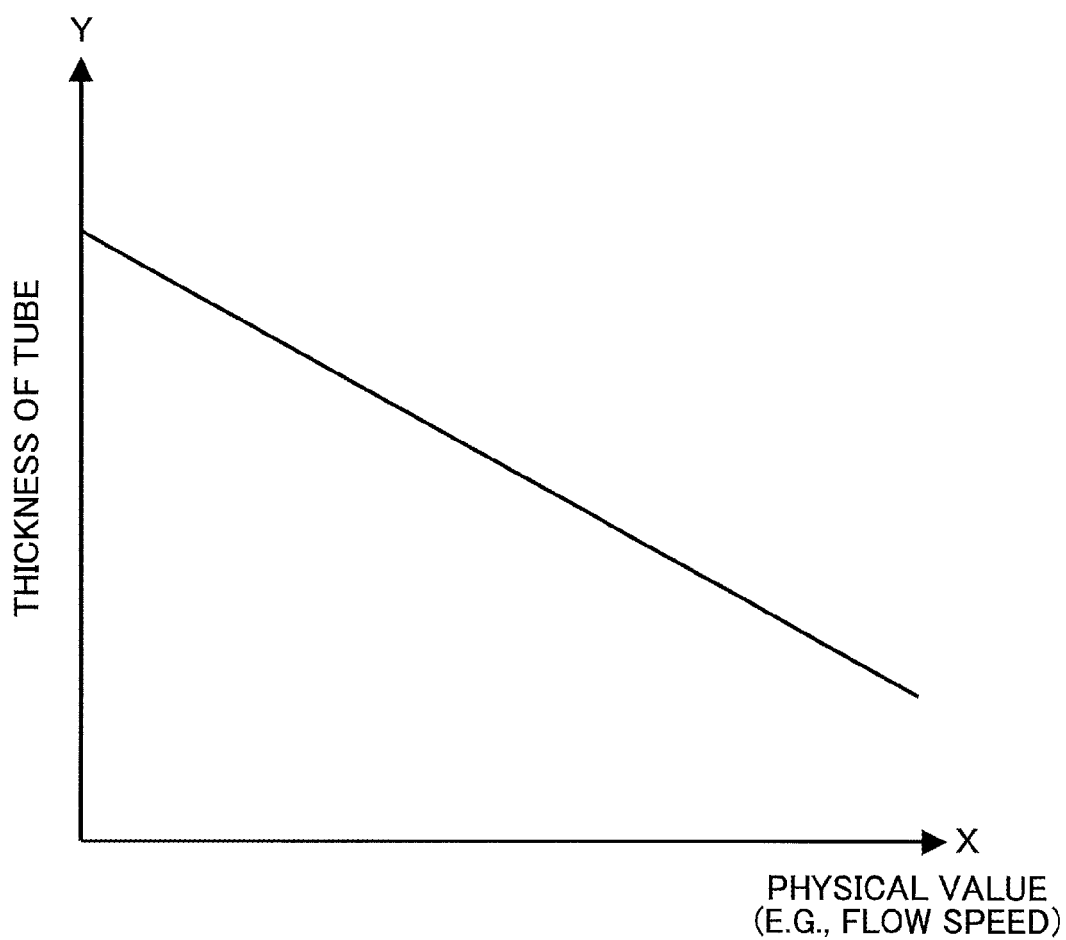
FIG. 8 is a schematic view illustrating a mapping between a physical value and thickness of a tube.

FIG. 8 is a schematic view illustrating a mapping between a physical value and thickness of a tube. For example, the thickness of a tube is made thicker if the speed of a fluid (flow speed) is smaller (namely, the length of a side among sides of the quadrangle that crosses the flow line is made greater). Conversely, the thickness of a tube is made thinner if the speed of the fluid (flow speed) is greater (namely, the length of a side among sides of the quadrangle that crosses the flow line is made smaller).

Figure 9:
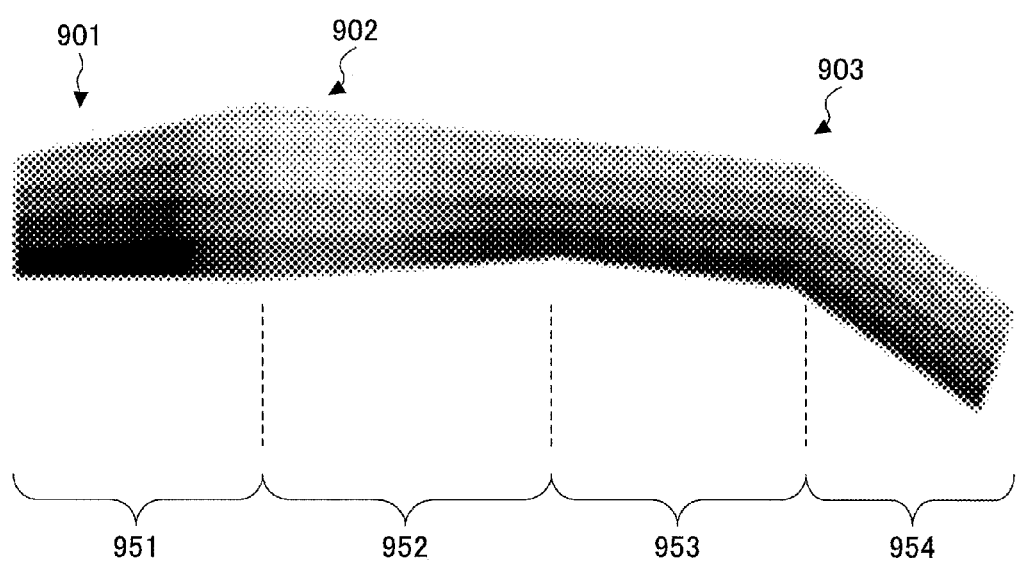
FIG. 9 is a schematic view illustrating two physical values mapped on thickness and color of a tube.

FIG. 9 illustrates an example of a result of rendering obtained by using the relationships in FIG. 7 and FIG. 8 to form a band of facets to which texture mapping is applied. In FIGS. 9, 951 to 954 denote quadrangles respectively. A drawn tube is thin at regions of 901 and 903, and thick at a region of 902. This implies that the flow speed is smaller at the region of 902 than at the other regions (see FIG. 8). Also, although illustrated in black and white in FIG. 9, the regions of 901 and 903 are assumed to be illustrated in red, and the region of 902 is assumed to be illustrated in yellow. Therefore, it can be understood that the region of 902 has a lower temperature than the other regions.

Figure 10A:
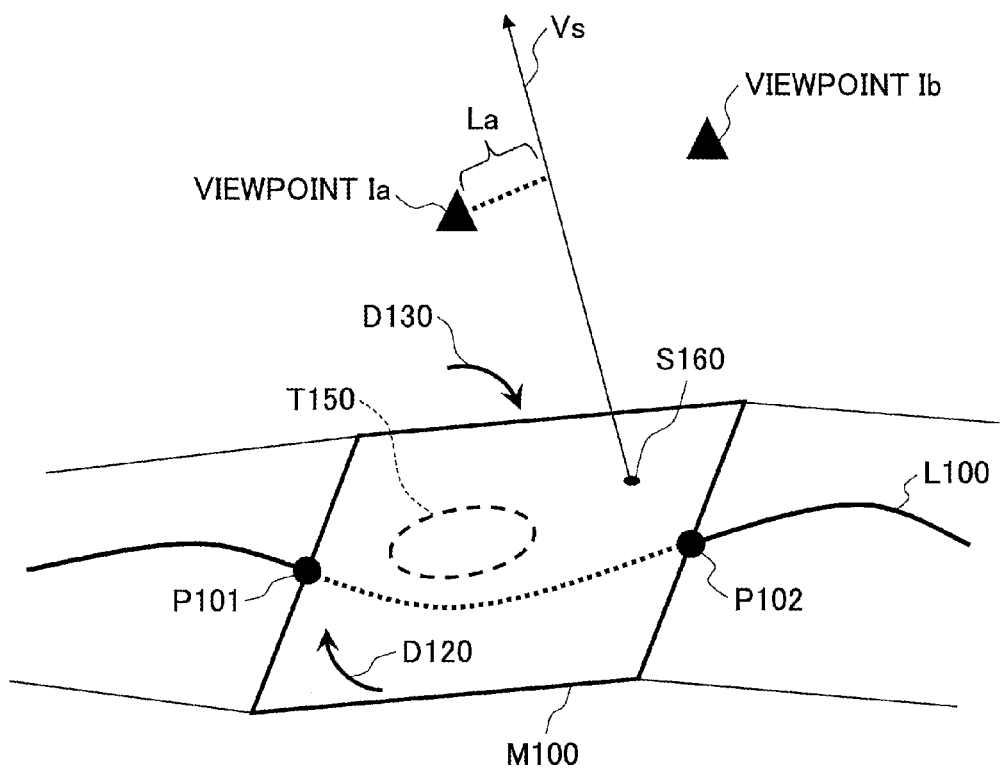
FIG. 10A is a schematic view illustrating determination of a direction of a quadrangle with respect to a viewpoint Ia.
Figure 10B:
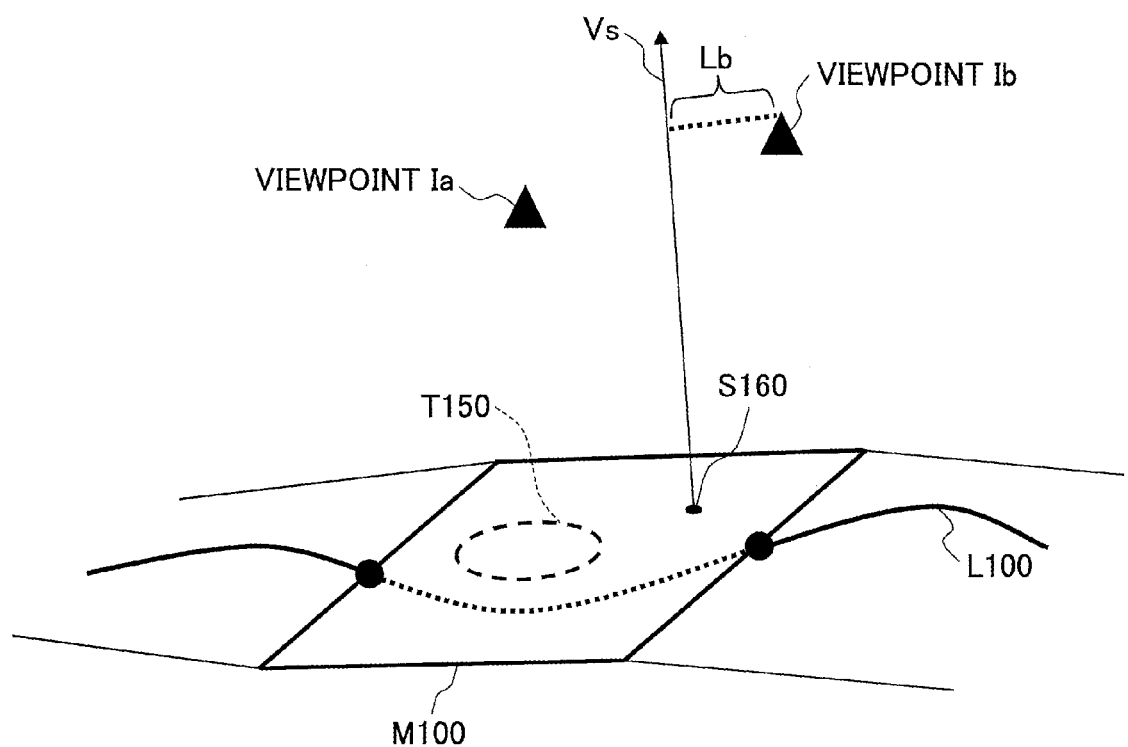
FIG. 10B is a schematic view illustrating determination of a direction of a quadrangle with respect to a viewpoint Ib.

FIG. 10A and FIG. 10B illustrate a process for determining a direction of a facet of a quadrangle M100 when the viewpoint is moved from a viewpoint Ia to a viewpoint Ib.

First, the viewpoint is positioned at the viewpoint Ia in FIG. 10A. Two sides facing each other in the quadrangle M100 come into contact with the flow line L100 at the nodal points P101-P102, respectively. In this case, the quadrangle M100 can be changed so that the slope of the facet leans in a direction D120 or a direction D130. The slope of the facet of the quadrangle M100 can be determined, for example, as follows when the viewpoint is at the position of the viewpoint Ia.

[Determination of the Direction of the Quadrangle M100 when the Viewpoint is at the Position of the Viewpoint Ia]

(1) Set a unit area T150 on the quadrangle M100. Then, determine the slope of the quadrangle M100 so that the area T150 is at a maximum when viewed from the viewpoint Ia. Alternatively, (2) Extend a normal vector Vs with respect to the quadrangle M100 from an arbitrary point S160 on the quadrangle M100. Then, draw a perpendicular from the viewpoint Ia to the normal vector Vs, and determine the slope of the quadrangle M100 so that the length La of the perpendicular is at a minimum.

(3) Determine the slope of the quadrangle M100 so that the total of respective distances from four corner points of the quadrangle M100 to the viewpoint is at a minimum.

These are examples of procedures to determine the slope of the quadrangle M100. Another method of determining the slope of the quadrangle M100 other than the above may be found by one skilled in the art.

FIG. 10B illustrates a process for determining a direction of the facet of the quadrangle M100 when the viewpoint has been moved from the viewpoint Ia to the viewpoint Ib.

As described above, the slope of the quadrangle M100 may be determined so that the area T150 is at a maximum when viewed from the viewpoint Ib. Alternatively, a normal vector Vs with respect to the quadrangle M100 is extended from an arbitrary point S160 on the quadrangle M100. Then, a perpendicular is drawn from the viewpoint Ib to the normal vector Vs, and the slope of the quadrangle M100 may be determined so that the length Lb of the perpendicular is at a minimum.

Figure 10C:
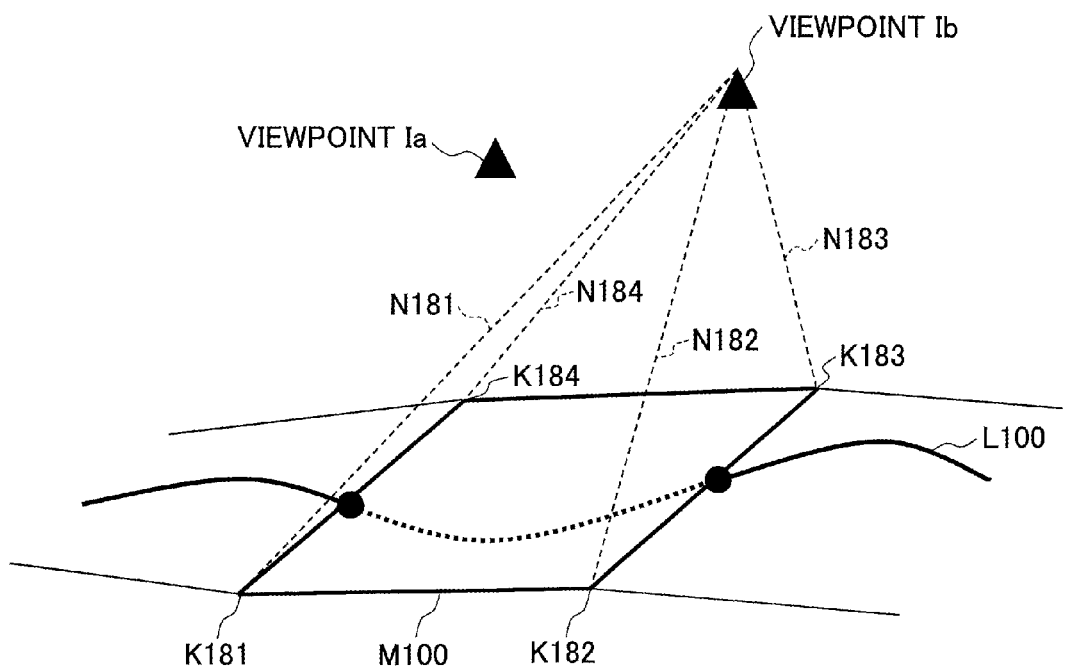
FIG. 10C is a schematic view illustrating determination of a direction of a quadrangle with respect to a viewpoint Ib.

FIG. 10C illustrates another process for determining a direction of the facet of the quadrangle M100 when the viewpoint has been moved from the viewpoint Ia to the viewpoint Ib. Here, lines connecting the viewpoint Ib with vertices K181, K182, K183, and K184 of the quadrangle M100 are denoted N181, N182, N183, and N184, respectively. The slope of the quadrangle M100 may be determined so that the total of lengths of the respective lines N181, N182, N183, and N184 is at a minimum.

By determining the slope of the facet of by performing the above operation for other quadrangles, the slope of the band of facets is changed as a whole. After that, by applying texture mapping and performing rendering, a 2D image of the tube-shaped flow line can be obtained that is viewed from the new viewpoint Ib.

In this way, a band of facets is generated, and rendering is performed using texture mapping so that a band of facets has looks of a tube-shaped form. The number of polygons can be reduced by using a band of facets rather than generating actual tubes in a 3D-space as done conventionally. Therefore, a process for visualizing a flow line can be shortened compared to a conventional process. Also, if a viewpoint is changed, a direction of a facet of a quadrangle can be changed as described above to be applied with texture mapping and rendering. As above, a 2D image can be obtained faster than as done conventionally if a line of sight is changed due to a fewer number of polygons.

Note that to determine the slope of the facet of a quadrangle even faster, a line-of-sight vector and a field of vision (not shown) may be further taken into consideration. Namely, a part of a 3D model is identified that is finally applied with rendering by a line-of-sight vector and a field of vision. Only the identified part of the 3D model needs to be focused to be applied with change of the slopes of quadrangles, texture mapping, rendering, and the like in a restricted way.

Figure 11A:
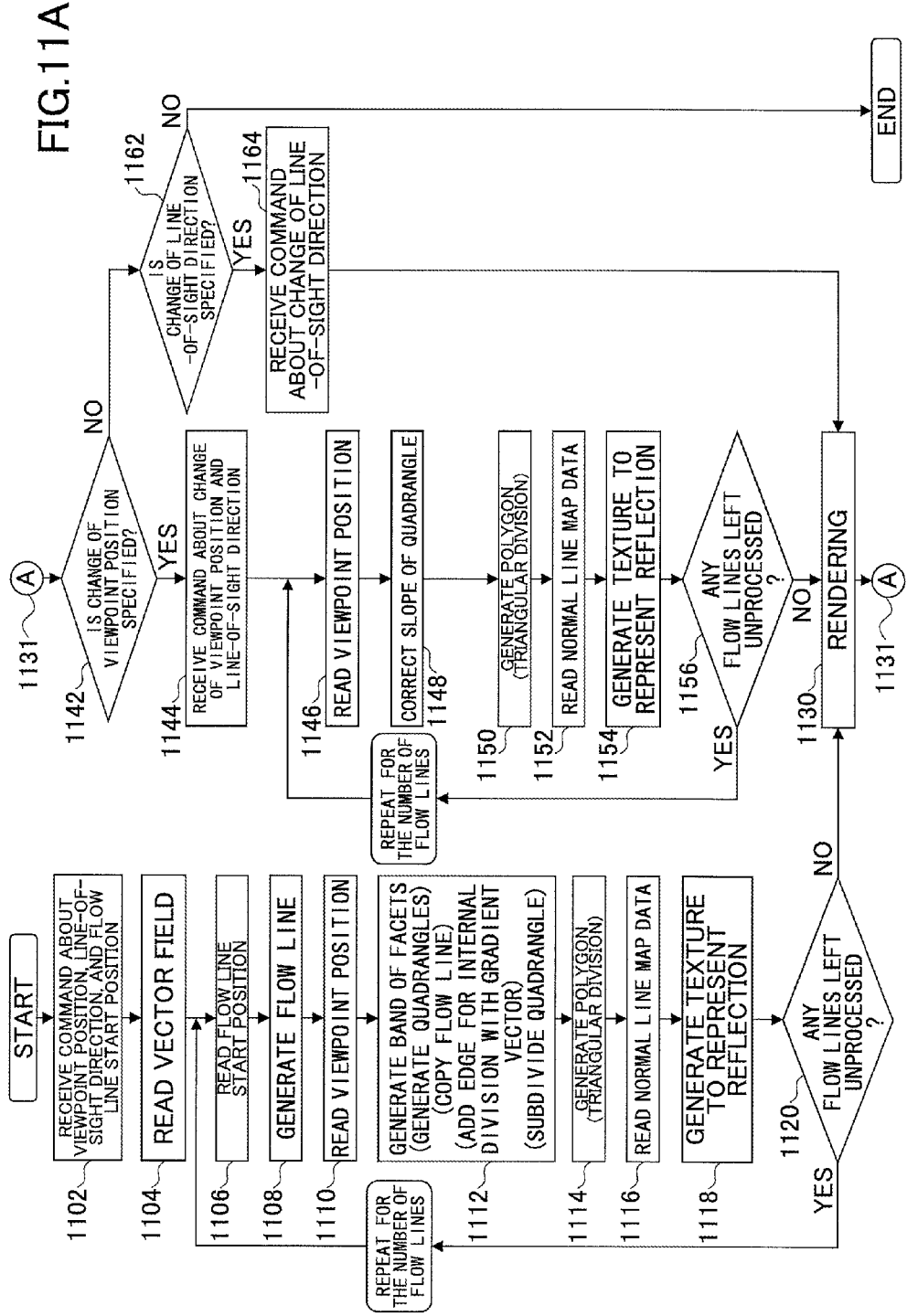
FIG. 11A is a schematic view illustrating a process flow according to an embodiment.

FIG. 11A illustrates a process flow according to an embodiment. In the following process flow, the order of the steps may be exchanged unless contradiction arises. Moreover, it is needless to say that steps of any one of the claims related to a program or steps of any one of the claims related to a method may be executed in an exchanged order of the steps unless contradiction arises. Further, even if the steps of any one of the claims are exchanged, they are included in the technological scope of the claim. Also, it should be noted that there are cases where data has been already stored in a storage section so that a command from a user does not need to be received. In addition, if there are no commands from a user, a process may be executed using default values.

At Step 1102, a command on a viewpoint position in a 3D-space, a line-of-sight direction, and a start position of a flow line is first received from a user. Note that the data may be stored in a storage device beforehand.

At Step 1104, data of a vector field obtained by simulation or the like is read.

At Step 1106, the start position of the flow line is read that has been stored in the storage section.

At Step 1108, the flow line is generated.

At Step 1110, the viewpoint position is read that has been stored in the storage section.

At Step 1112, a band of facets is generated along the flow line. Here, first, multiple quadrangles are generated. Next, the flow line is copied to generate a new flow line. Next, at both sides of each of the quadrangles, if the amount of change of a gradient vector along the flow line is greater than a predetermined threshold value th, the quadrangle is partitioned, for example, at the midpoint. Note that the flow line may not be copied, but nodal points in the flow line may be appropriately increased to form quadrangles with adjacent nodal points as mentioned earlier. Note that the length of a side of a quadrangle including the nodal points may be determined using a predetermined function based on, for example, physical values (for example, speed or temperature) at the nodal points, At Step 1114, a diagonal line is drawn in the quadrangle to generate two triangles. This procedure is applied to all quadrangles. Having being applied with this procedure, the band of facets is represented by triangular polygons. Note that polygons are not necessarily triangles. Therefore, the quadrangles as they are may be treated as the polygons for this procedure. Note that when using triangular polygons, the process for the 3D model is made easier.

At Step 1116, data of a normal line map is read. Data of the normal line map of a rectangle may be stored as the normal line map. If an actual quadrangle is a rhombus or a trapezoid, the normal line map of the rectangle can be applied to the rhombus or trapezoid. For example, vertices of the rectangle may be associated with vertices of the trapezoid, and the amount of deformation may be distributed proportionately to calculate the normal line map of the trapezoid.

At Step 1118, using the normal line map, a texture is generated to represent reflection. Also, the texture may be generated with color that corresponds to a physical value (for example, speed or temperature)) at each position of the flow line.

At Step 1120, it is checked whether any unprocessed flow lines are left. If there are any unprocessed flow lines, the procedure goes back to Step 1106. Note that the number of flow lines is equivalent to the number of start positions of the flow lines. If there are no unprocessed flow lines, generation of the band of facets and texture mapping for every flow line is completed. In this case, the procedure goes forward to Step 1130.

At Step 1130, tube-shaped flow lines viewed from the viewpoint position in the line-of-sight direction are applied with rendering. Data having being applied with rendering is displayed on a display unit. Next, the procedure goes forward to Step 1142 via "A".

At Step 1142, it is checked whether a user specifies a command to change the viewpoint. This is because there are cases where a user wants to observe a state of flow lines by changing the viewpoint position. If it is determined with the check that the viewpoint position is not to be changed, the procedure goes forward to Step 1162.

At Step 1132, it is checked whether a user specifies a command to change the line-of-sight direction. If it is determined with the check that the line-of-sight direction is not to be changed, the procedure goes forward to Step 1164.

At Step 1164, a command of the line-of-sight direction is received from the user. In this case, as the viewpoint position has not been changed, the field of view is instructed to be changed. In this case, a 2D image may be applied with rendering that corresponds to the viewpoint and line-of-sight direction given at Step 1130.

If it is determined "YES" with the check at Step 1142, the procedure goes forward to Step 1144.

At Step 1144, a change command of the viewpoint position and line-of-sight direction is received from the user, which is stored into the storage section. In this case, there are cases where the line-of-sight direction is not to be changed, but only the viewpoint position is to be changed.

At Step 1146, the received viewpoint position is read.

At Step 1148, the slope of each of the quadrangles of the band of facets is corrected based on the viewpoint position.

At Step 1150, polygons are generated. This step is similar to Step 1114.

At Step 1152, the normal line map data is read. This step is similar to Step 1116.

At Step 1154, using the normal line map, a texture is generated to represent reflection. Also, the texture may be generated with color that corresponds to physical values (for example, speed or temperature)) at each position of the flow line. This step is similar to Step 1118.

At Step 1156, it is checked whether any unprocessed flow lines are left. If there are any unprocessed flow lines, the procedure goes back to Step 1146. If there are no unprocessed flow lines, generation of the band of facets and texture mapping for every flow line is completed. In this case, the procedure goes forward to Step 1130 to perform rendering.

At Step 1162, if the line-of-sight direction is not to be changed (NO), no further steps are required because the user does not want to change the viewpoint position and line-of-sight direction, which concludes the series of steps.

Figure 11B:
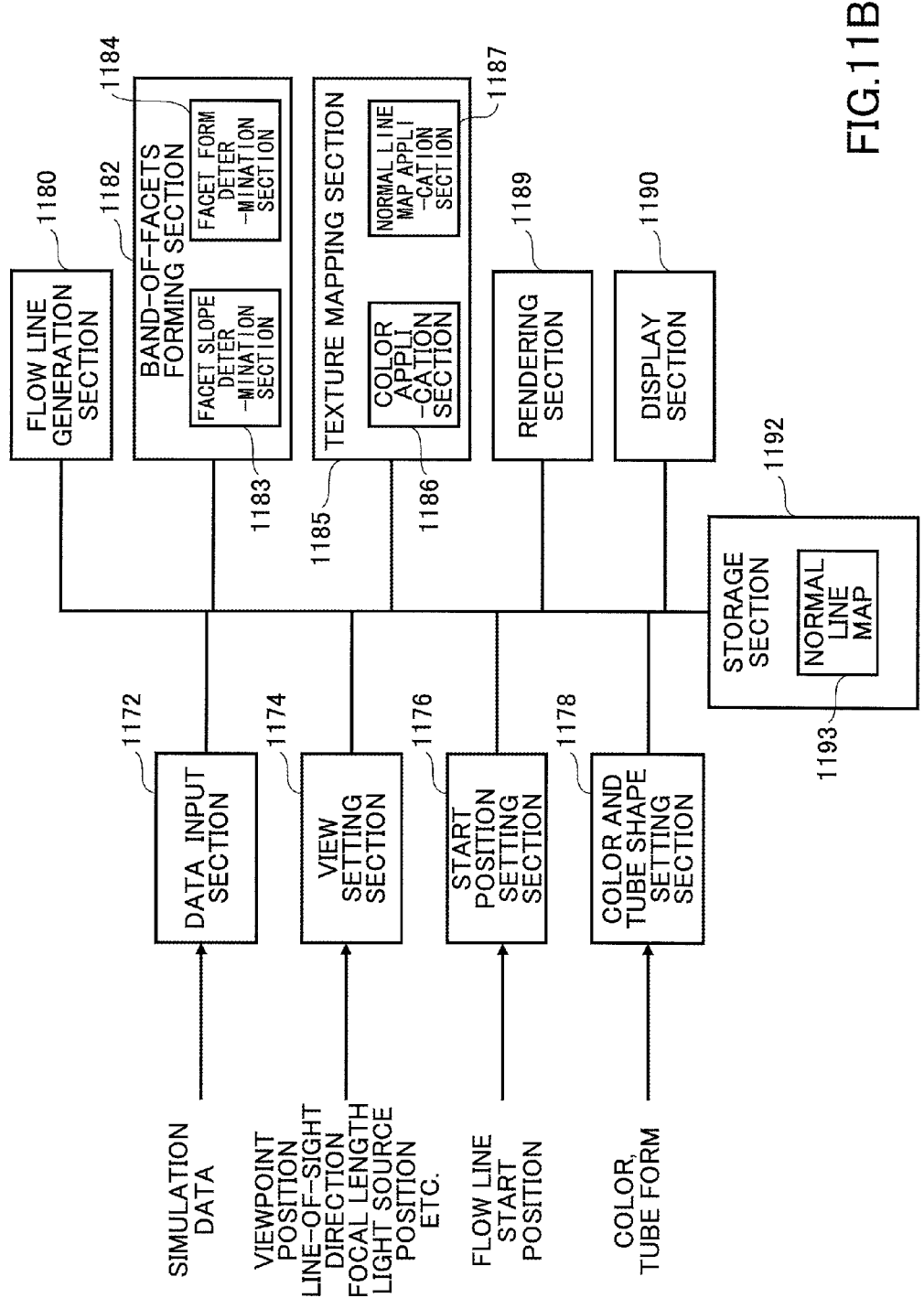
FIG. 11B is a block diagram illustrating a processor according to an embodiment.

FIG. 11B illustrates a block diagram of a processor according to an embodiment. First, vector data such as simulation data of flow of a fluid and the like is read at a data input section 1172, which is stored into a storage section 1192.

A view setting section 1174 receives a command from a user. For example, a viewpoint position, a line-of-sight direction, a focal distance, a position of a light source in a 3D-space, and the like are received to be stored into the storage section 1192.

A start position setting section 1176 receives a user specification on a start position of a flow line that represents flow of the fluid. The data is stored into the storage section 1192.

A color and tube shape setting section 1178 receives a user specification of setting about color of a tube shape. For example, if the temperature of the fluid at each position of the flow line is mapped onto color of a tube, for example, the mapping relationship as illustrated in FIG. 7 is set. Also, thickness of a tube may be associated with a physical value of the fluid. In this case, as illustrated in FIG. 8, for example, the flow speed of the fluid may be associated with the thickness of a tube. Note that the thickness of a tube can be controlled by elongating or contracting the width of each side of each quadrangle forming the band of facets.

A flow line generation section 1180 generates a flow line using the start position of the flow line received at the start position setting section 1176 stored in the storage section 1192 and the simulation data. If multiple start positions are set, multiple flow lines are generated.

A band-of-facets forming section 1182 forms a band of facets. At a facet form determination section 1184, multiple quadrangles are determined along the flow line. At a facet slope determination section 1183, slopes of the multiple quadrangles are determined. With this process, the band of facets is formed. Also, the band of facets is partitioned into triangular polygons. Note that the facet slope determination section 1183 is also used for changing the slope of a facet if the position of the viewpoint and the like is changed.

A texture mapping section 1185 maps texture for each of the multiple quadrangles. A color application section 1186 applies color to the texture based on the mapping between a physical value and color as described above. A normal line map application section 1187 reads a normal line map 1193 from the storage section 1192. Next, the position of a light source and a normal vector of the normal line map are applied to the slope of the quadrangle, and the texture having reflection simulated is mapped onto the quadrangle.

A rendering section 1189 draws a tube that visualizes the flow line on a 2D plane.

The display section 1190 displays an image having rendering applied.

Figure 12:
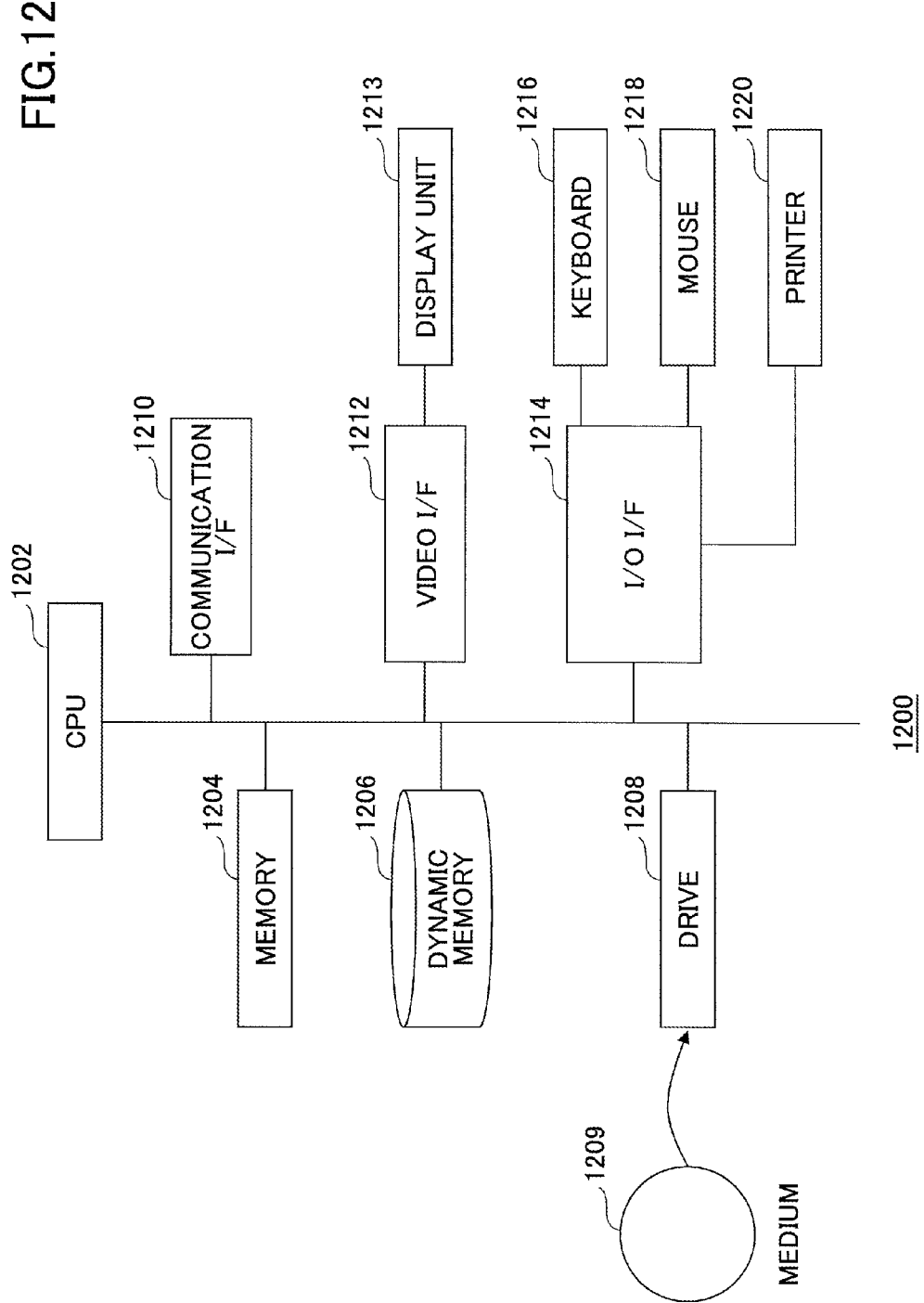
FIG. 12 is a schematic view illustrating an embodiment hardware configuration.

FIG. 12 illustrates a hardware configuration 1200 according to an embodiment. Hardware includes a CPU 1202, a memory 1204, a dynamic memory 1206, a drive 1208 for read/write of a medium 1209, a communication interface 1210, a video interface 1212 to transmit an image signal to a display unit 1213 and the like, an I/O interface 1214, a keyboard 1216, a mouse 1218, a printer 1220 as I/O.

The CPU 1202 executes programs that implement various function described above and are stored in the memory 1204 and dynamic memory 1206.

Also, the programs relevant to the present invention may be stored into a machine readable recording medium. The machine readable recording medium may be a magnetic storage medium, an optical disk, an optical-magnetic storage medium, a semiconductor memory, or the like. A magnetic storage medium may be an HDD, a flexible disk (FD), a magnetic tape (MT), or the like. An optical disk may be a DVD (Digital Versatile Disc), a DVD-RAM, a CD-ROM (Compact Disc-Read Only Memory), a CD-R (Recordable)/RW (ReWritable), or the like. Also, an optical-magnetic storage medium may be an MO (Magneto-Optical disk), or the like.

Figure 13A:
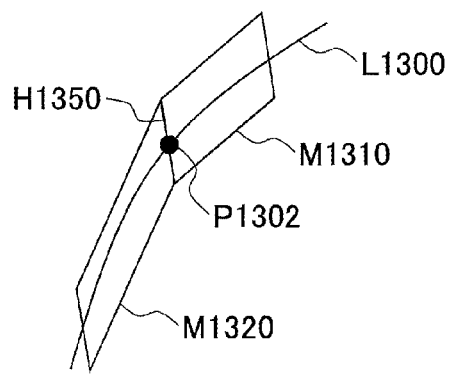
FIGS. 13A-13C are schematic views illustrating correction of a quadrangle if the slope of the quadrangle is changed.
Figure 13B:
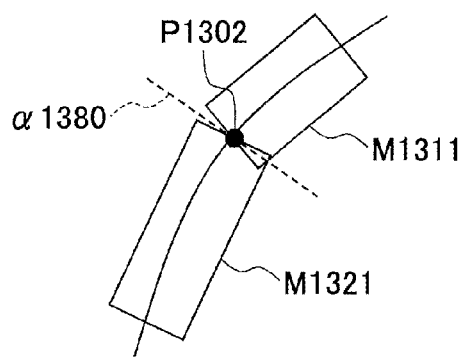
Figure 13C:
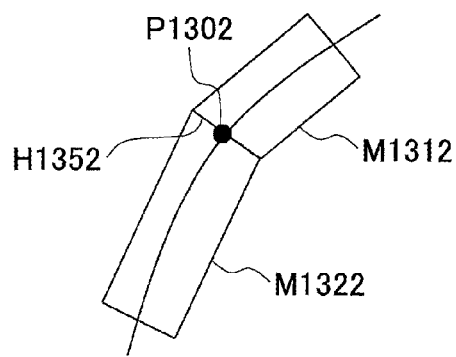

FIGS. 13A-13C are schematic views illustrating correction of a quadrangle if the slope of the quadrangle is changed. In FIG. 13A, quadrangles M1310-M1320 for a flow line L1300 share a side H1350 that passes a nodal point P1302. Assume that the position of a viewpoint (not shown) has been changed, and the process for changing the slopes of these quadrangles has been executed, which makes the slopes of the two quadrangles changed as illustrated with M1311 and M1321 in FIG. 13B. In this case, there are cases where the two quadrangles M1311 and M1321 do not share a side anymore. Therefore, a line α1380 is obtained so that it passes through the nodal point P1302, and extended planes that include the quadrangles M1311 and M1321, respectively, cross each other on the line α1380. The quadrangles M1312 and M2322 may be corrected as illustrated in FIG. 13C so that the shared side H1352 is taken on the obtained line α1380. This process is applied to other sides shared with other quadrangles, respectively.

Figure 14A:
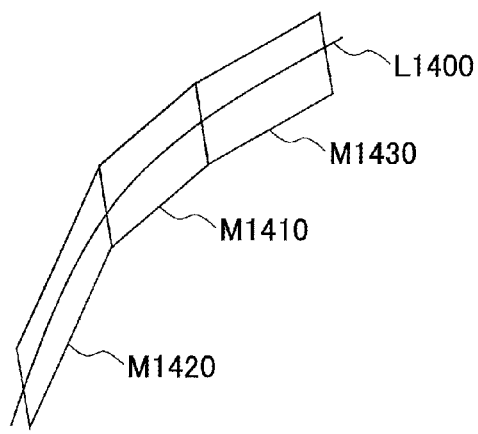
FIGS. 14A-14C are schematic views illustrating correction of a quadrangle if the slope of the quadrangle is changed.
Figure 14B:
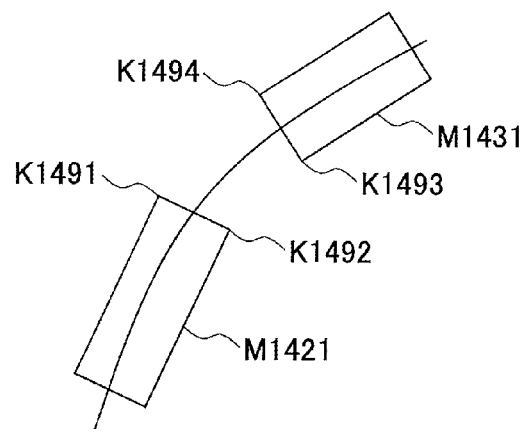
Figure 14C:
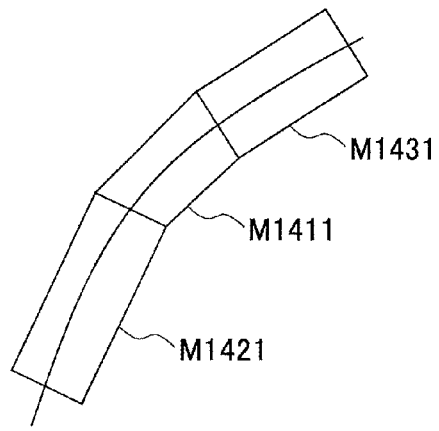

FIGS. 14A-14C are schematic views illustrating correction of a quadrangle if the slope of the quadrangle is changed. In FIG. 14A, quadrangles M1410, M1420, and M1430, are formed along a flow line L1400 to constitute a band of facets. These three quadrangle share sides with adjacent quadrangles, respectively. FIG. 14B illustrates a state where the position of a viewpoint (not shown) is changed and the slope of the quadrangles at both ends are changed. Namely, the quadrangles M1431 and M1421 have their slopes changed. Next, in this state, vertices K1491 and K1494 of the respective quadrangles are connected with each other. Similarly, vertices K1492 and K1492 of the respective quadrangles are connected with each other. FIG. 14C illustrates a state where a new quadrangle M1411 is formed as a result. With this process, the slope of a quadrangle can be changed easily. Note that there are cases where the newly generated quadrangle M1411 may not be a flat plane in the strict sense, but a twisted plane. In this case, it may be approximated with flat planes (for example, by partitioning the quadrangle at the diagonal line to be replaced with two triangular polygons) to be applied with rendering and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A drawing apparatus comprising a processor configured to draw a flow line representing flow of a fluid in a 3D-space as a 2D image viewed from an arbitrary viewpoint position, the processor further configured to:

generate the flow line from a predetermined start position;

set the viewpoint position in the 3D-space;

form a band of facets connecting a plurality of polygon facets along the flow line based on the set viewpoint position; and map texture onto each of the plurality of polygon facets, the texture representing reflected light on the band of facets with respect to a light source placed at a predetermined position in the 3D-space, wherein the processor is configured to determine a slope of each of the plurality of polygon facets so that an area of each of the plurality of polygon facets when viewed from the set viewpoint position is maximized, a length of a perpendicular drawn from the set viewpoint position to a normal line extended from a specific point existing on each of the plurality of polygon facets is minimized, or a total of respective distances between each vertex of the plurality of polygon facets and the set viewpoint position is minimized, and the processor is configured to form the band of facets such that sides of the plurality of polygon facets passing through nodal points of the flow line are set to have a length which is determined depending on a physical value of the fluid at the corresponding nodal point, wherein the processor is further configured to generate new flow lines by translating the flow line to the new flow lines which pass through vertices of the plurality of polygon facets, determine a gradient of a line segment connecting two adjacent nodal points in each of the flow line and the new flow lines, generate a new nodal point between the two adjacent nodal points each time a difference of the gradient of the line segment connecting the two adjacent nodal points is greater than a predetermined threshold value, generate a new side which connect the new nodal points generated in each of the flow line and the new flow lines, and generate a polygon facet which is formed with the new side and any of the sides of the plurality of polygon facets adjacent to the new side.

2. The drawing apparatus as claimed in claim 1, wherein the processor is further configured to map the texture onto each of the plurality of polygon facets, the texture representing reflected light on the band of facets with respect to the light source placed at the predetermined position in the 3D-space, using normal line information representing a normal line to the light source placed at the predetermined position in the 3D-space.

3. The drawing apparatus as claimed in claim 1, wherein the processor is further configured to form the band of facets so that a side shared by a first polygon facet and a second polygon facet crosses the flow line, the first polygon facet and the second polygon facet being adjacent to each other among the plurality of polygon facets.

4. The drawing apparatus as claimed in claim 1, wherein the processor is further configured to map the texture onto each of the plurality of polygon facets, based on a physical value of the fluid at each position of the flow line corresponding to each of the plurality of polygon facets.

5. The drawing apparatus as claimed in claim 1, wherein the processor is further configured to determine a form of each of the plurality of polygon facets based on a physical value of the fluid at each position of the flow line corresponding to each of the plurality of polygon facets.

6. A method of drawing a flow line representing flow of a fluid in a 3D-space as a 2D image viewed from an arbitrary viewpoint position, the method being executed by a computer, and the method comprising:

generating the flow line from a predetermined start position;

setting the viewpoint position in the 3D-space;

forming a band of facets connecting a plurality of polygon facets along the flow line based on the set viewpoint position; and mapping texture onto each of the plurality of polygon facets, the texture representing reflected light on the band of facets with respect to a light source placed at a predetermined position in the 3D-space, wherein the forming includes determining a slope of each of the plurality of polygon facets so that an area of each of the plurality of polygon facets when viewed from the set viewpoint position is maximized, a length of a perpendicular drawn from the set viewpoint position to a normal line extended from a specific point existing on each of the plurality of polygon facets is minimized, or a total of respective distances between each vertex of the plurality of polygon facets and the set viewpoint position is minimized, and wherein the forming includes forming the band of facets such that sides of the plurality of polygon facets passing through nodal points of the flow line are set to have a length which is determined depending on a physical value of the fluid at the corresponding nodal point, wherein the forming includes generating new flow lines by translating the flow line to the new flow lines which pass through vertices of the plurality of polygon facets, determining a gradient of a line segment connecting two adjacent nodal points in each of the flow line and the new flow lines, generating a new nodal point between the two adjacent nodal points each time a difference of the gradient of the line segment connecting the two adjacent nodal points is greater than a predetermined threshold value, generating a new side which connect the new nodal points generated in each of the flow line and the new flow lines, and generating a polygon facet which is formed with the new side and any of the sides of the plurality of polygon facets adjacent to the new side.

7. A non-transitory computer-readable recording medium having a program stored therein for causing a computer to execute a process of drawing a flow line representing flow of a fluid in a 3D-space as a 2D image viewed from an arbitrary viewpoint position, the process comprising:

generating the flow line from a predetermined start position;

setting the viewpoint position in the 3D-space;

forming a band of facets connecting a plurality of polygon facets along the flow line based on the set viewpoint position; and mapping texture onto each of the plurality of polygon facets, the texture representing reflected light on the band of facets with respect to a light source placed at a predetermined position in the 3D-space, wherein the forming includes determining a slope of each of the plurality of polygon facets so that an area of each of the plurality of polygon facets when viewed from the set viewpoint position is maximized, a length of a perpendicular drawn from the set viewpoint position to a normal line extended from a specific point existing on each of the plurality of polygon facets is minimized, or a total of respective distances between each vertex of the plurality of polygon facets and the set viewpoint position is minimized, and wherein the forming includes forming the band of facets such that sides of the plurality of polygon facets passing through nodal points of the flow line are set to have a length which is determined depending on a physical value of the fluid at the corresponding nodal point, wherein the forming includes generating new flow lines by translating the flow line to the new flow lines which pass through vertices of the plurality of polygon facets, determining a gradient of a line segment connecting two adjacent nodal points in each of the flow line and the new flow lines, generating a new nodal point between the two adjacent nodal points each time a difference of the gradient of the line segment connecting the two adjacent nodal points is greater than a predetermined threshold value, generating a new side which connect the new nodal points generated in each of the flow line and the new flow lines, and generating a polygon facet which is formed with the new side and any of the sides of the plurality of polygon facets adjacent to the new side.

* * * * *